UNITED STATES PATENT OFFICE 2,418,249

ABRASIVE ARTICLES

Charles E. Drake, Bloomfield, N. J., assignor to United States Rubber Company, New York, N. Y., a corporation of New Jersey No Drawing. Application June 30, 1945, Serial No. 602,673

8 Claims. (Cl. 51—299)

The present invention relates to the manufacture of abrasive articles and more particularly to a flexible and resilient type of hard rubber grinding wheels.

This application is a continuation-in-part of my application Serial No. 492,123, filed June 24, 1943, (which matured into Patent No. 2,381,266, dated August 7, 1945), which in turn is a continuation-in-part of my application Serial No. 448,835, filed June 27, 1942.

Abrasive articles in which abrasive grains are bonded by an irreversible or non-thermoplastic bond, for example, hard vulcanized rubber, or synthetic resin of the phenol-formaldehyde or similar type, are well known. In the hard-rubber type bond, the rubber is mixed with about one-half its weight of sulfur, the abrasive grains mixed in, and the material vulcanized to a hard non-resilient grinding wheel or other kind of abrasive article.

According to the present invention, a hard-rubber type bonded abrasive article is produced that has appreciable flexibility and resilience, yet approaches the strength of ebonite. Although a soft rubber compound may be loaded with fillers so as to have almost any degree of hardness, such highly loaded soft-vulcanized rubber compounds, if used as a bonding medium for abrasive grains, will be found very poor in mechanical strength, and if less filler is used, the vulcanized compound will be too soft for many uses, being unable to hold the abrasive grains in place firmly enough to do the work expected of them.

In carrying out the present invention, the abrasive grains are bonded with a vulcanized composition containing hard rubber and a synthetic rubber-like material which will cure irreversibly to a state resembling soft vulcanized rubber but which will not cure to a hard state comparable to that of hard rubber. Examples of such synthetic rubber-like materials that may be mixed with the rubber and sulphur, and vulcanized to give a resilient and flexible hard-rubber type of abrasive article are certain of the so-called organic polysulphide polymer plastics. These synthetic rubber-like materials are obtainable commercially in an intermediate or partially polymerized and plastic state resembling unvulcanized rubber, and may be cured in a known manner to an elastic state resembling soft vulcanized rubber, but not to a hard state comparable to hard rubber. When abrasive grains are incorporated in a blend of these partially polymerized materials with a hard rubber mix and the mass cured or vulcanized, a resilient and flexible hard-rubber bond for the abrasive grains is formed. U. S. patent to Patrick 1,890,191 describes the reaction between alkali polysulphides and olefine compounds, particularly the dihalides, to produce the well known olefine polysulphide plastics, for example, the reaction products of alkali polysulphides and ethylene dichloride to produce ethylene polysulphide polymers. Such olefine polysulphide plastics are substantially polymers of the structural unit

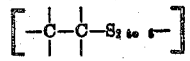

where the carbon atoms are adjacent. U. S. patent to Patrick 2,216,044 describes similar plastic polymers made by the reaction between alkali polysulphides and disubstituted ethers, particularly the dihalides, for example, dichlorodiethyl ether and dichlorodiethyl formal, to give oxydiethylene polysulphide polymers and methylene dioxydiethylene polysulphide polymers, respectively. In these compounds, the space between the adjacent carbon atoms in the above referred structural unit is opened up and an intervening ether linkage structure is employed, giving polymers of the structural unit

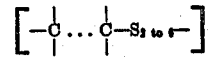

where

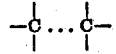

represents two carbon atoms separated by and joined to an intervening structure characterized by an ether linkage. The above polymers of the structural units

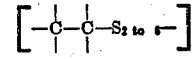

and

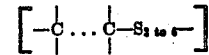

will be termed herein as "organic polysulphide polymer plastics." They are known commercially under the trade name Thiokols. The polymers of substantially the structural units

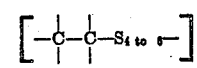

for example, ethylene polysulphide polymers having four to six sulphur atoms per repeating unit, viz. polymers of the repeating structural unit [—$C_2H_4$—$S_{4\text{ to }6}$—], and the polymers of substantially the structural unit $$\left[ -\underset{|}{\overset{|}{C}}\cdots\underset{|}{\overset{|}{C}}-S_{2\text{ to }6}- \right]$$

where $$-\underset{|}{\overset{|}{C}}\cdots\underset{|}{\overset{|}{C}}-$$

represents two carbon atoms separated by and joined to an intervening structure characterized by an ether linkage, for example, oxydiethylene polysulphide polymers having two to six sulphur atoms per repeating unit, viz., polymers of the repeating structural unit

[—$C_2H_4$—O—$C_2H_4$—$S_{2\text{ to }6}$—]

and methylene dioxydiethylene polysulphide polymers having two to six sulphur atoms per repeating unit, viz., polymers of the repeating structural unit

[—$C_2H_4$—O—$CH_2$—O—$C_2H_4$—$S_{2\text{ to }6}$—], may be cured or vulcanized in a known manner, generally by heating in the presence of 10 to 20 parts of zinc oxide per hundred parts of the Thiokol, to a state resembling soft vulcanized rubber but will not cure to a state comparable to hard rubber.

The term "rubber" as used herein, as in reference to soft vulcanized rubber and hard rubber, means natural rubber. It is well known that there are vast differences in the physical properties of soft vulcanized rubber, which contains up to 10 parts of combined sulphur per 100 parts of rubber, and hard rubber which contains 30 to 47 parts of combined sulphur per 100 parts of rubber. The terms "soft vulcanized rubber" and "hard rubber" are well understood in the art and the properties that distinguish one from the other are so well known that no further definition or distinction need be made than by use of these terms. As illustrative of the great difference in properties of the two materials, the modulus of rigidity of soft vulcanized rubber is of the order of 20 to 100 lbs. per sq. in., while the modulus of rigidity of hard rubber or ebonite is of the order of 100,000 to 200,000 lbs. per sq. in. The elongation at break of soft vulcanized rubber is several hundred percent, while the elongation at break of hard rubber is generally less than fifteen percent. Copolymers of a major proportion of butadiene-1,3 and a minor proportion of a monovinyl compound such as styrene or acrylic nitrile will cure on heating with twenty to forty or more parts of sulphur per one hundred parts of the copolymer to a condition or state in which their physical properties are comparable to those of hard rubber as described above. On the other hand, the organic polysulphide polymer plastics specified above will vulcanize only to a state or condition in which their physical properties resemble those of soft rubber, as described above, but will not cure to vulcanize to a state in which their properties are comparable to those of hard rubber.

The preferred proportions of rubber and organic polysulphide polymer plastic in the bond composition are within the range 1:5 to 5:1 parts by weight. With such proportions, bonded abrasive articles with widely varying grinding qualities, flexibility and hardness may be made.

Preferably, the rubber and sulphur are first mixed on a mill and then the partially polymerized rubberlike material, i. e., the organic polysulphide polymer plastic, together with curing and compounding ingredients, are blended with the previously mixed hard rubber stock. The resulting blend may then be mill-mixed with a given quantity of abrasive grains, such as aluminum oxide, silicon carbide, or any of the regularly known abrasives. After mixing the blended intermediate polymerized rubberlike material and hard rubber stock with the abrasive, the resulting mass may be formed into the desired shape of the article and cured. In making grinding wheels, the mix may be sheeted out to the prescribed thickness and, before or after cutting or dieing to shape, heat-cured, as in a press, for example, at 50 pounds steam pressure for upwards of three hours.

As illustrative of the invention, an example of a typical formula for the bond composition is as follows, the amounts of ingredients indicated being parts by weight: 100 parts of smoked sheet natural rubber, 50 parts of sulphur, 100 parts of Thiokol, and 20 parts of zinc oxide, together with such amounts of anti-oxidants, accelerators, etc., as are desired. For example, four parts of diphenyl guanidine may be added to the above formula as an accelerator. Another formulation for bond compositions is 100 parts of smoked sheet natural rubber, 50 parts of sulphur, 80 parts of Thiokol, and 8 parts of zinc oxide per 100 parts of Thiokol in the compound. The Thiokol in the formulas may be any of the commercial organic polysulphide polymer plastics which can be cured to a state resembling soft vulcanized rubber but not to a state comparable to hard rubber. Twenty parts by weight of the above bond compounds were mixed with 80 parts by weight of abrasive grains, and the masses sheeted and formed into grinding wheels which were press-cured. The cured compositions of the present invention are not limited to bonding abrasives. The natural rubber and butyl rubber with the vulcanizing ingredients may be sheeted or molded, and cured or vulcanized with or without contact or attachment to some other material, such as fabric or metal, to give hard-rubber type vulcanizates where additional flexibility and resilience is desired.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. An abrasive article comprising abrasive grains and a bond containing the vulcanization product of a mixture of rubber, sulphur in amount to vulcanize said rubber to hard rubber and an organic polysulphide polymer plastic selected from the group consisting of polymers of one of the repeated structural units [—$C_2H_4$—$S_{4\text{ to }6}$—],

[—$C_2H_4$—O—$C_2H_4$—$S_{2\text{ to }6}$—] and

[—$C_2H_4$—O—$CH_2$—O—$C_2H_4$—$S_{2\text{ to }6}$—]

2. An abrasive article comprising abrasive grains and a bond containing the vulcanization product of a mixture of rubber, sulphur in amount to vulcanize said rubber to hard rubber, and an organic polysulphide polymer plastic selected from the group consisting of ethylene polysulphide polymers having four to six sulphur atoms per repeating unit, oxydiethylene polysulphide polymers having two to six sulphur atoms per repeating unit, and methylene dioxydiethylene polysulphide polymers having two to six sulphur atoms per repeating unit.

3. An abrasive article comprising abrasive grains and a bond containing the vulcanization product of a mixture of rubber, sulphur in amount to vulcanize said rubber to hard rubber and an organic polysulphide polymer plastic selected from the group consisting of polymers of one of the repeating structural units $[-C_2H_4-S_{4 \text{ to } 6}-]$, $$[-C_2H_4-O-C_2H_4-S_{2 \text{ to } 6}-] \text{ and}$$

$$[-C_2H_4-O-CH_2-O-C_2H_4-S_{2 \text{ to } 6}-]$$

the proportions of rubber and the organic polysulphide polymer plastic being within the range 1:5 to 5:1 parts by weight.

4. An abrasive article comprising abrasive grains and a bond containing the vulcanization product of a mixture of rubber, sulphur in amount to vulcanize said rubber to hard rubber, and an organic polysulphide polymer plastic selected from the group consisting of ethylene polysulphide polymers having four to six sulphur atoms per repeating unit, oxydiethylene polysulphide polymers having two to six sulphur atoms per repeating unit, and methylene dioxydiethylene polysulphide polymers having two to six sulphur atoms per repeating unit, the proportions of rubber and the organic polysulphide polymer plastic being within the range 1:5 to 5:1 parts by weight.

5. An abrasive article comprising abrasive grains and a bond containing the vulcanization product of a mixture of rubber, sulphur in amount to vulcanize said rubber to hard rubber, and an organic polysulphide polymer plastic of the repeating structural unit $$[-C_2H_4-O-C_2H_4-S_{2 \text{ to } 6}-]$$

6. An abrasive article comprising abrasive grains and a bond containing the vulcanization product of a mixture of rubber, sulphur in amount to vulcanize said rubber to hard rubber, and an organic polysulphide polymer plastic reaction product of an alkali polysulphide and dichlorodiethyl ether.

7. An abrasive article comprising abrasive grains and a bond containing the vulcanization product of a mixture of rubber, sulphur in amount to vulcanize said rubber to hard rubber, and an organic polysulphide polymer plastic of the repeating structural unit $$[-C_2H_4-O-C_2H_4-S_{2 \text{ to } 6}-]$$

the proportions of rubber and the organic polysulphide polymer plastic being within the range 1:5 to 5:1 parts by weight.

8. An abrasive article comprising abrasive grains and a bond containing the vulcanization product of a mixture of rubber, sulphur in amount to vulcanize said rubber to hard rubber, and an organic polysulphide polymer plastic reaction product of an alkali polysulphide and dichlorodiethyl ether, the proportions of rubber and the organic polysulphide polymer plastic being within the range 1:5 to 5:1 parts by weight.

CHARLES E. DRAKE.

REFERENCES CITED

The following references are of record in the file of this patent:

UNITED STATES PATENTS

| Number | Name | Date |
| --- | --- | --- |
| 1,890,231 | Patrick et al. | Dec. 6, 1932 |
| 2,040,698 | Lewis et al. | May 12, 1936 |
| 2,384,683 | Kistler | Sept. 11, 1945 |